(12) United States Patent
Whitney (10) Patent No.: US 7,341,155 B2
(45) Date of Patent: Mar. 11, 2008

(54) SYSTEMS AND METHODS FOR PROCESSING WASTE MATERIALS

(75) Inventor: John P. Whitney, Little Rock, AR (US)

(73) Assignee: Rineco Chemical Industries, Inc., Benton, AR (US)

( * ) Notice: Subject to any disclaimer, the term of this patent is extended or adjusted under 35 U.S.C. 154(b) by 181 days.

(21) Appl. No.: 11/245,697

(22) Filed: Oct. 7, 2005

(65) Prior Publication Data

US 2006/0081505 A1 Apr. 20, 2006

Related U.S. Application Data

(60) Provisional application No. 60/616,891, filed on Oct. 7, 2004.

(51) Int. Cl.
*B03C 1/00* (2006.01)
(52) U.S. Cl. .................. 209/213; 209/214; 209/223.1; 209/218; 209/226
(58) Field of Classification Search ............... 209/213, 209/214, 218, 223.1, 226
See application file for complete search history.

(56) References Cited

U.S. PATENT DOCUMENTS

| | | | |
|---|---|---|---|
| 4,631,125 A * | 12/1986 | Parks | 209/215 |
| 4,686,034 A * | 8/1987 | Barrett | 209/223.1 |
| 4,933,074 A * | 6/1990 | Fuller et al. | 209/540 |
| 5,117,771 A | 6/1992 | Summers | |
| 5,147,527 A * | 9/1992 | Hettinger | 208/120.35 |
| 5,337,684 A | 8/1994 | Summers | |
| 5,411,714 A | 5/1995 | Wu et al. | |
| 5,653,183 A | 8/1997 | Hansen et al. | |
| 6,226,889 B1 | 5/2001 | Aulbaugh et al. | |
| 6,253,924 B1 * | 7/2001 | Bleifuss et al. | 209/223.1 |
| 6,318,558 B1 * | 11/2001 | Exner | 209/2 |
| 6,467,629 B1 * | 10/2002 | Exner | 209/219 |
| 6,540,088 B2 * | 4/2003 | Oder et al. | 209/218 |
| 6,619,214 B2 | 9/2003 | Walker | |

* cited by examiner

*Primary Examiner*—Patrick Mackey
*Assistant Examiner*—Terrell Matthews
(74) *Attorney, Agent, or Firm*—McGuirewoods LLP (57) ABSTRACT

Systems and methods for disposing of waste material are disclosed, in which a cross-belt magnet configuration is employed to separate ferromagnetic substances from waste material. For some embodiments, the system includes a first conveyor belt, a magnet, and a second conveyor belt. The first conveyor belt is configured to carry waste materials in a first direction. The magnet is located in proximity to the first conveyor belt such that the first conveyor belt is within range of the attractive force of the magnet. The magnet attracts the ferromagnetic substances. The second conveyor belt is interposed between the magnet and the first conveyor belt. The second conveyor belt is positioned non-parallel to the first conveyor belt, and is configured to carry the attracted ferromagnetic substances in a second direction, which is non-parallel to the first direction.

12 Claims, 4 Drawing Sheets

FIG. 1

SYSTEMS AND METHODS FOR PROCESSING WASTE MATERIALS

CROSS REFERENCE TO RELATED APPLICATIONS

This application claims the benefit of U.S. provisional patent application Ser. No. 60/616,891, filed Oct. 7, 2004, which is incorporated herein by reference in its entirety.

FIELD OF THE DISCLOSURE

The present disclosure relates generally to waste processing, and more particularly to systems and methods for processing heterogeneous waste materials.

BACKGROUND

Industry produces large amounts of waste that must be processed and disposed of by waste operators. Most of this waste is heterogeneous waste, which includes liquids and solids, which is friable and non-friable, which melts at various temperatures, has various solidification temperatures, low auto-ignition temperatures, and high vapor pressure. The waste material also includes both ferrous and non-ferrous metals in a wide range of sizes. This waste is often categorized by applicable environmental regulations as "hazardous waste" because of its often flammable, corrosive, or toxic character. Thus, the disposal of such waste is heavily regulated by environmental regulations.

There are inefficiencies associated with currently-available processes for disposing of industrial waste. Thus, a heretofore unaddressed need exists in the industry for systems and methods of processing waste materials.

SUMMARY

The present disclosure provides systems and methods of processing waste material.

Briefly described, in architecture, one embodiment of the system comprises a first chamber and a second chamber. The first chamber operates at a first temperature, while the second chamber operates at a second temperature. Preferably, the second chamber operates at a higher temperature than the first chamber.

The first chamber heats waste material to approximately the first temperature. The heating of the waste material produces vapors, which are output through a vapor outlet of the first chamber. The remaining waste material is conveyed to the second chamber.

The second chamber heats the remaining waste material to approximately the second temperature. The heating of the remaining waste material produces additional vapors, which are output through a vapor outlet of the second chamber. Any further remaining waste material is output from the second chamber.

In addition to providing systems for processing waste material, the present disclosure also provides methods for processing waste material. As such, one embodiment of the method is a multi-step process, wherein the waste material is processed in two or more steps. Specifically, for some embodiments, an earlier step of the process heats the waste material at a first temperature. This results in a release of vapors for those materials having a boiling point that is lower than the first temperature. A subsequent step of the process heats some or all of the remaining waste material at a second temperature, which is preferably higher than the first temperature. The subsequent heating results in a release of additional vapors for those materials having a boiling point that is lower than the second temperature. Such a multi-step process has benefits that cannot easily be obtained by other processes.

In yet another embodiment, among others, systems and methods are provided for disposing of waste materials. For that embodiment, the system includes a vibrating screen that operates at above approximately 750 vibrations per minute. The vibrations cause separation of particles, similar to a sifting mechanism. Some of the separated particles are then removed.

In still other embodiments, systems and methods for disposing of waste material are disclosed, in which a cross-belt magnet configuration is employed to separate ferromagnetic substances from waste material. For such embodiments, the system includes a first conveyor belt, a magnet, and a second conveyor belt. The first conveyor belt is configured to carry waste materials in a first direction. The magnet is located in proximity to the first conveyor belt such that the first conveyor belt is within range of the attractive force of the magnet. The magnet attracts the ferromagnetic substances. The second conveyor belt is interposed between the magnet and the first conveyor belt. The second conveyor belt is positioned non-parallel to the first conveyor belt, and is configured to carry the attracted ferromagnetic substances in a second direction, which is non-parallel to the first direction.

For other embodiments, systems and methods for processing waste material are presented. For such embodiments, the system comprises a chamber, an inlet, a fluid outlet, a metal outlet, and a magnet. The inlet is configured to selectively open and close. The inlet injects waste material into the chamber when the inlet is open. The waste material is suspended in a fluid medium, and comprises both ferromagnetic substances and non-ferromagnetic substances. The magnet is a selectively activated magnet coupled to the chamber. The magnet is configured to activate when the inlet is open, and deactivate when the inlet is closed. The magnet attracts the ferromagnetic substances from the waste material when the magnet is activated. The attracted ferromagnetic substances are released from the magnet when the magnet is deactivated. The metal outlet configured to selectively open and close. The metal outlet opens and expels the released ferromagnetic material from the magnet when the magnet is deactivated. The fluid outlet configured to selectively open and close. The fluid outlet opens when the magnet is activated, and expels any remaining waste material after the magnet has substantially attracted the ferromagnetic substances from the waste material.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

As noted above, industry produces large amounts of waste that must be processed and disposed of by waste operators. However, there are inefficiencies associated with currently-available processes for disposing of industrial waste. The present disclosure provides systems and methods of processing waste material.

Briefly described, for some embodiments, a multi-step process is provided in which waste material is processed in two or more steps. Specifically, for some embodiments, an earlier step of the process heats the waste material at a first temperature. This results in a release of vapors for materials having a boiling point that is lower than the first temperature. A subsequent step of the process heats some or all of the remaining waste material at a second temperature, which is preferably higher than the first temperature. The subsequent heating results in a release of additional vapors for those materials having a boiling point that is lower than the second temperature. Such a multi-step process permits efficient handling of waste materials.

Figure 1:
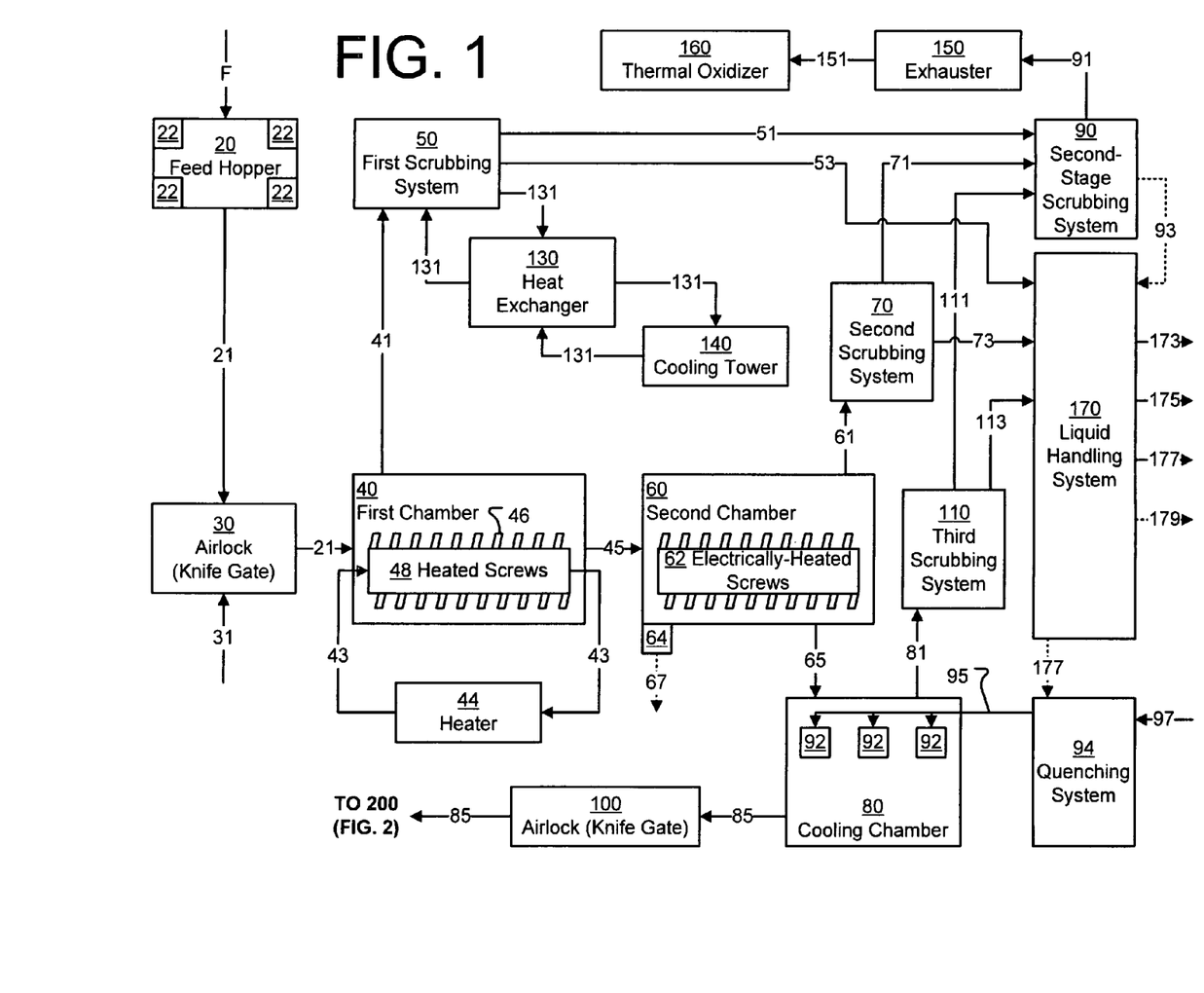
FIG. 1 is a block diagram showing one embodiment, among others, of a heterogeneous waste processing system.

FIG. 1 is a block diagram showing one embodiment, among others, of a waste processing system. In the embodiment of FIG. 1, the system comprises a feed hopper 20, which is configured to receive heterogeneous waste material, also referred to as feedstock F. For some embodiments, the feed hopper 20 is mounted on load cells 22, thereby permitting weight-based, rather than volumetric, feed control. For some embodiments, the feed rate can be designed for approximately 12000 lbs per hour. Since such volumetric control of inputs is known in the art, further discussions of the feed hopper 20 and the load cells 22 are omitted.

The feed hopper 22 provides the waste material 21 to a first chamber 40 through an airlock 30. The airlock 30, for some embodiments, is a knife gate, which largely isolates the first chamber 40 from the feed hopper 20. The airlock 30 limits air infusion into the first chamber 40, which is, for some embodiments, a sub-ambient pressure chamber 40. This isolation removes dependence on a dynamic seal. Also, the improved seals limit or prevent appreciable influx of air into the system, thereby reducing the chances for unplanned oxidation and also reducing the amount of non-condensable gases that flow through the system. The reduced flow also reduces the amount of condensable vapors that flow out of the system since the mole fraction (vapor pressure) is constant.

For some embodiments, an inerting gas 31 (e.g., carbon dioxide, nitrogen, etc.) is injected into the airlock 30 to displace air or other oxidizing agents. This reduces the oxidation that can occur in the subsequent stages of the waste processing system.

Since such isolation mechanisms and inerting gases are known in the art, further discussion of the airlock 30 is omitted. However, one having skill in the art will appreciate that other mechanisms for isolating the first chamber 40 from the feed hopper 20 can readily be employed.

The first chamber 40, for some embodiments, is a volatiles evaporator. As such, for those embodiments, the first chamber 40 comprises a heated screw 48 having hollow threads 46. The heated screw 48 is operatively coupled to a heater 44, which is configured to provide heat to the heated screw 48. Preferably, the heated screw 48 is heated using a heat transfer fluid 43, such as, for example, oil. For some embodiments, the heated screw 48 is approximately three feet in diameter and approximately thirty feet in length. In operation, the heater 44 circulates the heat transfer fluid 43 to the heated screw 48, thereby maintaining the temperature of the heated screw 48 at a relatively constant temperature. The heating of the screw 48 results in a corresponding heating of the interior of the first chamber 40. For some embodiments, the temperature of the heat transfer fluid 43 ranges from approximately 650 to approximately 700 degrees Fahrenheit, thereby heating the first chamber 40 to approximately 600 degrees.

Given this configuration, when the waste material 21 enters the first chamber 40, the hollow threads 46 of the screw 48 move the waste material 21 through the first chamber 40 while progressively heating the waste material 21. The heating of the waste material 21 results in the release of vapors 41. For example, if the screw 48 is maintained at approximately 650 degrees, then waste material having a boiling point that is lower than approximately 650 degrees will vaporize due to the applied heat. For ease of reference, these vapors 41 are referred to herein as lower-boiling point vapors 41. The heated surface also limits condensing of vapors, thereby avoiding buildup of material. For some embodiments, the first chamber 40 can be jacketed, thereby minimizing cold spots where vapors could otherwise condense.

The lower-boiling point vapors 41 are evacuated from the first chamber 40 by a first scrubbing system 50. For some embodiment, the first scrubbing system 50 comprises one or more Venturi scrubbers, which are known in the art. One embodiment of the first scrubbing system 50 is described in greater detail with reference to FIG. 2. These Venturi scrubbers are particle removers, which remove fine particles from volatile, hazardous, or corrosive gas streams. Since Venturi scrubbers are widely used throughout the chemical industry, further discussion of Venturi scrubbers is omitted here.

The first scrubbing system 50 is operatively coupled to a heat exchanger 130, which is, in turn, operatively coupled to a cooling tower 140. The fluid 131 circulating in a particular Venturi scrubber may also serve as the condensate for that Venturi scrubber. A cooling tower 140 and a heat exchanger 130 can be located on each loop to provide the appropriate cooling mechanism for the Venturi scrubber.

Upon receiving the lower-boiling point vapors 41, the first scrubbing system 50 cools the received vapors 41. The cooling of the vapors 41 produces one or more condensates 53 and various non-condensable vapors 51, such as, for example, carbon dioxide, air, etc. Both the condensates 53 and the non-condensable vapors 51 are output from the first scrubbing system 50.

The non-condensable vapors 51 are input to a second-stage scrubbing system 90, which, for some embodiments, may be Venturi scrubbers similar to those in the first scrubbing system 50. The resulting output of the second-stage scrubbing system 90 are additional condensables 93 and residual non-condensable vapors 91.

The purge from each Venturi scrubber, for some embodiments, would be by level control. Sufficient cooling water at or below approximately 86 degrees Fahrenheit can be circulated through the heat exchangers 130 to cool most of the condensable vapors. The non-condensables that pass through a primary Venturi scrubber to a secondary Venturi scrubber are cooled to below 90 degrees using chilled water. The non-condensable vapors 91 comprise these cooled gases.

The residual non-condensable vapors 91 are directed to a thermal oxidizer unit 160 through an exhauster 150. As is known in the art, the thermal oxidizer unit 160 destroys air toxics and volatile organic compounds that are discharged. For some embodiments, the additional condensables 93 (e.g., water, lower boiling point hydrocarbons, etc.) are directed to a liquid handling system 170 for further processing.

The liquid handling system 170 receives various condensates, processes those condensates, and outputs oil product 173, waste fuel 175, waste water 177, and clean waste water 179. Since the liquid handling system 170 is discussed in detail with reference to FIG. 2, no further discussion of the liquid handling system 170 is provided with reference to FIG. 1.

Referring back to the first chamber 40, the heating of the waste material 21 also results in remaining waste material 45 (e.g., melted plastics, solids, and other molten material) that remains after the lower-boiling point vapors 41 have been released. The remaining waste material 45 is discharged to a second chamber 60, which further heats the remaining waste material.

The second chamber 60 comprises an electrically-heated screw 62, which is configured to heat the interior of the second chamber 60, preferably to a temperature that is higher than the temperature of the first chamber 40. For some embodiments, that temperature is approximately 1000 degrees Fahrenheit. At this temperature, some of the residual plastics and fibrous materials may crack. Also, at this temperature, char becomes friable. In some embodiments, the second chamber 60 is capable of approximately 6000 lbs per hour of input. For some embodiments, the electrically-heated screw 62 may be approximately three feet in diameter, and approximately twenty feet in length.

When the remaining waste material 45 enters the second chamber 60, the electrically-heated screw 62 moves the remaining waste material 45 through the second chamber 60 while heating the remaining waste material 45. Since, for this embodiment, the temperature of the second chamber 60 is higher than the temperature of the first chamber 40, the heating of the remaining waste material 21 results in the release of vapors 61 that have a higher boiling point than those from the first chamber 40. For example, if the electrically-heated screw 62 heats the second chamber to approximately 1000 degrees, then material having a boiling point that is lower than approximately 1000 degrees will vaporize due to the applied heat. For ease of reference, these vapors 61 are referred to herein as higher-boiling point vapors 61. Examples of higher-boiling point vapors 61 may include various plastics and hydrocarbons.

These higher-boiling point vapors 61, which are output from the second chamber 60, are provided to a second scrubbing system 70. For some embodiments, the second scrubbing system 70 comprises one or more Venturi scrubbers, similar to those described with reference to the first scrubbing system 50. Upon receiving the higher-boiling point vapors 61, the second scrubbing system 70 cools those vapors 61, resulting in the production of various condensates 73 and various non-condensable vapors 71.

The non-condensable vapors 71 are conveyed to the second-stage scrubbing system 90, where those non-condensable vapors 71 are disposed in a manner similar to the vapors 51 from the first scrubbing system 50. The condensates 73 are provided to the liquid handling system 170 for further processing.

Returning to the second chamber 60, once the higher-boiling point vapors 61 have been released, any residual waste 65 (e.g., metal, char, other remaining waste material) is output from the second chamber 60 to a cooling chamber 80. It should be appreciated that the residual waste 65 can also be further separated, if desired. For example, the second chamber 60 can optionally include a port 64 for expelling any molten plastic 67 for recycling. Thus, for those embodiments, the discharged residual waste 65 may have a lower concentration of molten plastics.

The cooling chamber 80 comprises one or more water sprays 92, which are configured to spray and cool the material in the cooling chamber 80. As such, the cooling chamber receives a water supply 95 from a quenching system 94, which is operatively coupled to the cooling chamber 80. The water supply 95 that is provided by the quenching system 94 may be fresh water 97, or a portion of the waste water 177 from the liquid handling system 170, or a combination of both 97, 177.

The cooling chamber 80 receives the residual waste 65, namely, further remaining waste material. Since the residual waste 65 has been exposed to extreme temperatures, some of the waste 65 is activated. In other words, some of the residual waste 65, such as any activated char, can react with air and self ignite, thereby posing a hazard. The cooling chamber 80 quenches the residual waste 65 to deactivate the residual waste 65. For some embodiments, the residual waste 65 is cooled to approximately 230 degrees Fahrenheit. The hydrating of the char also steam strips the remaining high-boiling hydrocarbons. Also, metals within the residual waste 65 can be cleaned and cooled by the sprays 92.

In the process of spraying the residual waste 65, scrubbed vapors 81 (e.g., water vapors and scrubbed hydrocarbons) are released. The released vapors 81 are provided to a third scrubbing system 110, which functions similar to the first scrubbing system 50 and the second scrubbing system 70. The resulting condensates 113 and non-condensable vapors 111 from the third scrubbing system 110 are provided to the liquid handling system 170 and the second-stage scrubbing system 90, respectively, for further processing.

The deactivated residual waste 85 (e.g., metals, hydrated char, etc.) from the cooling chamber 80 is conveyed to a metal separation system 200 via an airlock 100. The metal separation system is discussed in detail with reference to FIG. 2. Again, the airlock 100 isolates the cooling chamber, which may be a sub-ambient pressure chamber, from the metal separation system 200.

As seen with reference to FIG. 1, by providing multiple steps for processing waste, much of the waste that is not processed in an earlier step can be processed in subsequent steps, thereby providing greater handling of waste material. Additionally, progressively heating to higher temperatures avoids cracking of low molecular weight hydrocarbons.

Figure 2:
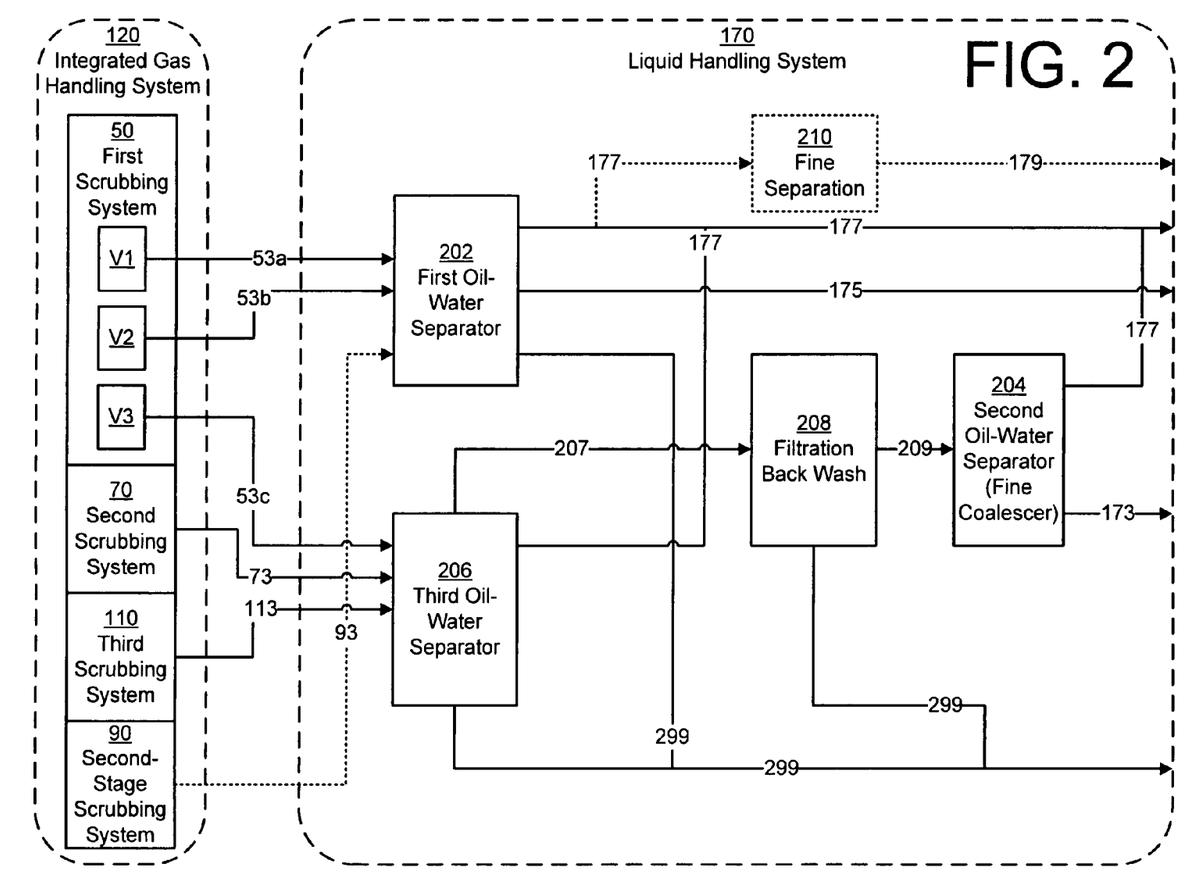
FIG. 2 is a block diagram showing, in greater detail, one embodiment of the liquid handling system of FIG. 1.

FIG. 2 is a block diagram showing, in greater detail, one embodiment of the liquid handling system 170 of FIG. 1. As shown in FIG. 2, and as discussed with reference to FIG. 1, the liquid handling system 170 receives its input from the following: the first scrubbing system 50, the second scrubbing system 70, the third scrubbing system 110, and the second-stage scrubbing system 90. For convenience, the scrubbing systems 50, 70, 90, 110 are collectively referred to as an integrated gas handling system 120. The integrated gas handling system 120 utilizes parallel flow, which removes the vapors as they are formed and reduces the velocities within a specific chamber, thereby reducing the entrained solids. For some embodiments, much of the vapor streams will be reduced to a temperature of approximately 120 degrees Fahrenheit in the first contact with a scrubbing system. This lower first stage temperature reduces high temperature liquid streams and improves condensation inefficiencies.

In the embodiment of FIG. 2, the first scrubbing system 50 comprises three Venturi scrubbers V1, V2, and V3. These Venturi scrubbers V1, V2, V3 are placed such that the saturated vapors super heat is minimal and that they do not condense and reflux prior to exiting the evaporator. The vapors are withdrawn at these three places, thereby making separate cuts possible, which maximize the possibility of producing a sealable product. Each Venturi scrubber V1, V2, V3 is sized to be able to take the full vapor flow from any probable feed composition at an approximately 12000 lbs per hour feed rate. For some embodiments, the Venturi scrubbers V1, V2, V3 are positioned in parallel so that any single scrubber may be taken off line for service during times of slightly reduced flows. This permits maintenance without complete shut down of the system.

Having multiple Venturi scrubbers allows the process to separately evacuate the vapors that have been somewhat separated according to their respective boiling points. At times, non-chlorinated fractions can be separated and potentially sold as recycled hydrocarbons having a significant value. This is especially so if they are redistilled to specification.

For some embodiments, the Venturi scrubbers can be controlled to hold a set inlet temperature. If the temperature of at the inlet of V1 rises above its set point, then it is drawing vapor from the next higher temperature zone. The flow rate would be decreased if V2 could not be increased. Likewise, if V2 inlet temperature falls below a set point, then V1 would be increased, if possible, else V2 would be reduced. For such embodiments, the vapor inlet temperature can be configured to control the distribution of flow among the various Venturi scrubbers.

The liquid handling system 170 comprises three oil-water separators 202, 206, 208. The first oil-water separator 202 and the third oil-water separator 206 receive their inputs from various scrubbers of the integrated gas handling system 120. For the embodiment of FIG. 2, the first oil-water separator 202 receives condensate 53a, 53b from V1 and V2, respectively. Optionally, the first oil-water separator 202 can also receive the condensate 93 from the second-stage scrubbing system 90.

Upon receiving condensates 53a, 53b, the first oil-water separator 202 separates the condensate 53a, 53b into waste fuel 175, waste water 177, and wet char 299, which are output from the liquid handling system 170. The waste fuel 175 is a higher-BTU (British Thermal Unit) waste output that has a lower disposal cost, while the waste water 177 is a lower-BTU waste output that has a relatively higher disposal cost. The wet char 299 includes various suspended solids.

For some embodiments, a portion of the waste water 177 is directed through a fine separation unit 210, which, to a certain extent, breaks down emulsions and provides fine filtration. For such embodiments, the fine separation unit produces clean waste water 179 as the output to the liquid handling system 170.

The third oil-water separator 206 receives, as its input, condensates 53c, 73, 113 from V3, the second scrubbing system 70, and the third scrubbing system 110, respectively. The third oil-water separator 206 separates the condensates 53c, 73, 113 into wet char 299, which is output from the liquid handling system 170, and various oils and suspended solids 207. The oil and suspended solids 207 are conveyed to a filtration back wash unit 208, which filters the suspensions from the oil. The suspensions are output as wet char 299. The oil is output to the second oil-water separator 204 having a fine coalescer.

The second oil-water separator 204 further breaks down emulsions and produces, as its output, oil product 173 and a relatively small amount of waste water 177, which are both output from the liquid handling system 170. As discussed with reference to FIG. 1, a portion of the waste water 177 may optionally be directed to the quenching system 94 to provide part of the water supply 95 for use in the cooling chamber 80.

The liquid handling system 170 of FIG. 2 separates the solids from the liquids and the water from the oil. Given the configuration of FIG. 2, the separation of high water streams from low water streams reduces the inclusion of water in the oil streams and increases the likelihood of producing a recyclable oil product 173. Also, the waste fuel 175 has a higher heating value (higher BTU) than current systems, and the cleaned waste water 179 can be disposed at reduced prices. The oil product 173 results from better separation of the lower boiling hydrocarbons and hydrochloric acid from the higher boiling and relatively chlorine-free materials. The reduced water in the product stream aids in dissolving much of the dissolvable matter in the product oil. Much of the condensing and entrained solids are removed in the automatically backwashed screens prior to the heat exchanger 130, since the temperature of the circulating liquids should, preferably, not exceed approximately 110 degrees. Hence, the fouling of the Venturi scrubbers should be reduced.

Figure 3:
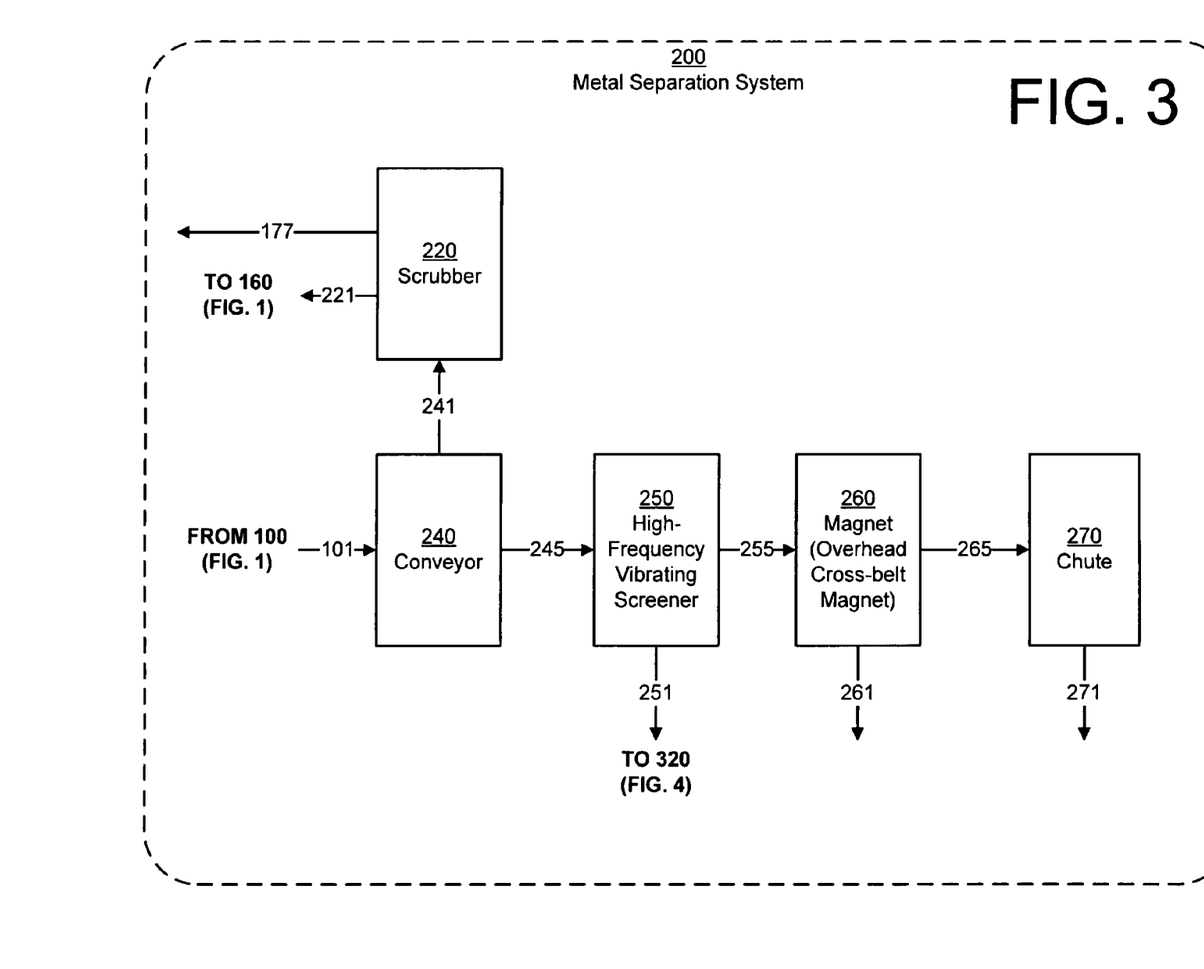
FIG. 3 is a block diagram showing one embodiment, among others, of a metal separation system associated with a heterogeneous waste processing system.

FIG. 3 is a block diagram showing one embodiment, among others, of a metal separation system 200 associated with a waste processing system. The metal separation system 200 converts metal bearing waste into multiple streams, which can be recycled if a market exists. The metal separation system 200 handles non-volatile fractions, including char, metal, and nonmagnetic inert substances such as, for example, glass, gravel, soil, sand, etc. As shown in FIG. 3, the metal separation system 200 comprises a conveyor 240, a high-frequency vibrating screener 250, a magnet 260, a chute 270, and another scrubber 220.

Continuing from the description of FIG. 1, the deactivated residual waste 85 (e.g., metals, hydrated char, etc.) from the cooling chamber 80 (FIG. 1) is conveyed to the metal separation system 200 via the airlock 100 (FIG. 1). The conveyor 240, which is preferably enclosed to be dust-tight, receives the residual waste 85. The conveyor 240 is operatively coupled to the scrubber 220, which draws the lighter gases and dust 241 from the conveyor 240. The scrubber 220, which is preferably a Venturi scrubber, again separates waste water 177 and non-condensables 221 for disposal, as described with reference to FIG. 1.

The conveyor 240 discharges the remaining particles 245 onto an inclined, high-frequency vibrating screener 250 that is also enclosed to be dust-tight. For some embodiments, the incline is at approximately 32 degrees from horizontal. Preferably, the vibrating screener 250 operates above approximately 750 vibrations per minute. More specifically, the screener 250 operates somewhere between approximately 900 and approximately 1800 vibrations per minute.

The frequency is set to a level that is sufficient to overcome the static forces that bind the carbon and the soil in the remaining particles 245. This is relatively difficult, since the surfaces of the metal are typically dented, folded, or wrinkled.

As a result of the vibration, the fine particles 251 are shaken free from the larger particles, and fall through the screen 250. The remaining larger particles 255 roll off of the inclined screen 250. These fine particles 251, which result from the vibration of the screener 250, are removed to a recirculation loop 340, which is described in greater detail with reference to FIG. 4.

Once the fine particles 251 are removed, the larger particles 255 are subjected to a magnetic separation process. For some embodiments, the magnet 260, which is preferably an overhead cross-belt electromagnet, is used to accelerate the metal components 265 upward against the belt that travels to the edge of the magnet 260.

Specifically, for some embodiments, the cross-belt arrangement is configured such that a lower first conveyor belt moves materials in a predefined direction. Above the first conveyor belt resides a second conveyor belt, which moves in a direction that is substantially perpendicular to the direction of the first conveyor belt. That second conveyor belt surrounds a magnet.

Thus, the larger particles 255 are moved along the first conveyor belt until they are brought into the range of the magnet. As those particles 255 come into range, the metal components 265 are attracted by the magnet and accelerated upward. Since the second conveyor belt surrounds the magnet, the metal components 265 are carried off in by the second conveyor belt in a direction that is substantially perpendicular to the first conveyor belt. The non-metal components 261 stay on the first conveyor belt, since they are not attracted by the magnet.

The field of the magnet diminishes toward the edge, thereby causing the metal 271 to fall free into the chute 270. This metal 271 can then be recycled or disposed. The non-magnetic substances 261 are not attracted by the magnet 260, and are disposed accordingly.

Since the metal can be relatively large (e.g., whole cans, etc.), the clearance between the lower conveyor belt and the cross belt should be sufficiently large to accommodate the various sizes of metals. For some embodiments, this can be somewhere between approximately 7 inches to approximately 12 inches.

For some embodiments, an electromagnet is preferable to a static magnet because of the manipulability of the magnetic field. For example, thin pieces of metal are not easily attracted due to their reduced surface area. However, once attracted, these thin pieces typically accelerate quickly, thereby impacting the belt with sufficient force to degrade the belt in a relatively short time span. The greater acceleration of a permanent magnet would be detrimental to the belt, yet not be sufficient to attract thin metal fragments.

Once attracted, the impact of the metal against the belt causes more non-magnetic particles to shake free from the ferrous metals.

Figure 4:
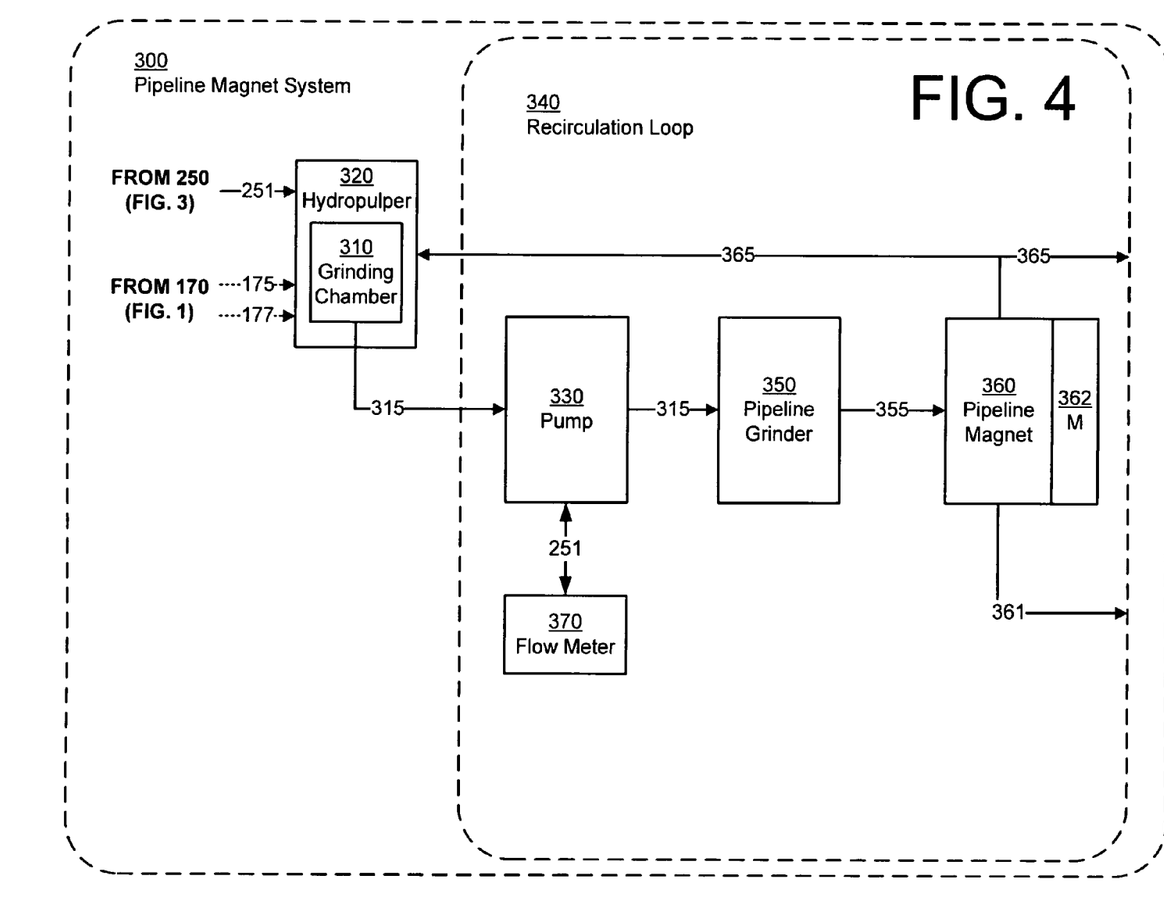
FIG. 4 is a block diagram showing one embodiment, among others, of a pipeline magnet system associated with a heterogeneous waste processing system.

FIG. 4 is a block diagram showing one embodiment, among others, of a pipeline magnet system 300 associated with a waste processing system. As shown in FIG. 4, the pipeline magnet system 300 includes a recirculation loop 340. Specifically, for the embodiment of FIG. 4, the recirculation loop 340 comprises a pump 330, a pipeline grinder 350, a pipeline magnet 360, and a flow meter 370.

In operation, the fine particles or fines 251 enter from the high-frequency vibrating screener 250 (FIG. 3) into a hydropulper 320, which includes a grinding chamber 310. In addition to the fines 251, the hydropulper 320 receives, as its input, either waste water 177, waste fuel 175, or a combination of waste water 177 and waste fuel 175 from the liquid handling system 170. The liquid 175/177 and fines 251 are ground together to form a sludge-like mixture 315, which is output from the hydropulper 320 to the recirculation loop 340.

The sludge-like mixture 315 from the hydropulper 320 is fed through the pump 330, which drives the recirculation loop 340. Preferably, the mixture 315 leaves the hydropulper 320 through half-inch holes, and into the recirculation loop 340. The pump 330 is controlled by the flow meter 370, which maintains the flow at a predetermined rate. The sludge-like mixture 315 is fed to the pipeline grinder 350, which further grinds the sludge-like mixture 315, resulting in finer suspended particles within the mixture 355. The resulting fine mixture 355 is directed to a pipeline magnet 360, which attracts ferromagnetic material 361 using the magnetic field of the magnetic 362. A portion of non-ferrous material (and remaining ferrous material) 365 is output, while the remaining portion of the non-ferrous material 365 is fed back to the hydropulper 320 for recirculation.

Given this configuration, this embodiment of the pipeline magnet system 300 functions as a trap for magnetic material. Also, the configuration of FIG. 4 permits controlled discharges, preferably in timed intervals, of a small amount of liquid within the metal into a container.

For some embodiments, each time the process shuts down, and each predetermined interval (e.g., twenty minutes), the pump shuts down for several seconds to purge the metal. In one embodiment, among others, the purge occurs as follows. The intake and discharge valves close, the electromagnet de-energizes, and a drain valve on the bottom of the chamber opens to discharge the metal and some liquid by gravity. To complete the cycle, the purge valve closes, the intake and discharge valves open, the magnet re-energizes, and the system restarts if the cycle was not complete. Preferably, the liquid can be decanted in order to dispose of the metal fines.

Having the pipeline magnet 360 within the recirculation loop 340 effectively ensures that the whole flow is within the magnetic field. Additionally, the flow meter effectively ensures that the velocity of flow is decreased sufficiently to prevent erosion of the bound particles from the magnetic surface within the chamber. The shape of the recirculation loop can be configured to enable the magnetic field to attract small particles out of a viscous stream. Moreover, the configuration of FIG. 4 permits the metal particles to be readily dumped when the magnet is de-energized.

For some embodiments, the flow chamber is a vertical two-inch thick cavity, which is approximately fourteen inches in width and approximately thirty-two inches in height. The bottom and the top of the flow chamber are concentric transitions to four inches and three inches, respectively. For such embodiments, the three-inch inlet is at the bottom of the rectangular face opposite the magnet with the flow directed toward the magnet.

Within the chamber, the flow is upward for some embodiments. For such embodiments, the flow dynamics naturally direct the densest particles to the sides. The thin channel forces the whole flow into close proximity to the magnet. Preferably, to withstand the 200 pounds-per-square-inch (psi) pressure in the system, the flow chamber is clamped to the magnet face. To facilitate the release of the particles on de-energizing the magnet, the chamber is constructed, preferably, of stainless steel. For some embodiments, the strength of the magnetic field is maximized by machining the back plate to allow the poles of the magnet to be only fractions of an inch from the face which holds the particles.

Stated differently, the pipeline magnet 360 includes an inlet (which receives the mixture 355), a fluid outlet (which expels the output 365), a metal outlet (which expels the ferromagnetic material 361), and a selectively activated magnet 362. The inlet, the fluid outlet, and the metal outlet each have a valve that can selectively open and close its respective inlet and outlets.

For some embodiments, the selectively activated magnet 362 can be an electromagnet that activates and deactivates with the supply and removal of power. For other embodiments, the selectively activated magnet 362 can be a permanent magnet that is moved toward and away from the pipeline in order to activate and deactivate the magnet by changing its fringe fields.

In operation, for some embodiments, the opening and closing of the inlet and the outlets is timed with the activation and deactivation of the magnet 362 in the following manner. During normal operation, the metal outlet is closed, while the inlet and the fluid outlet are opened. For normal operation, the magnet 362 is activated. Thus, as the mixture 355 enters the inlet, the ferromagnetic material 361 is attracted to the activated magnet 362, while the non-metallic output 365 is expelled through the fluid outlet.

During discharge operation, the metal outlet is opened, while the fluid outlet and the inlet are closed. For the discharge operation, the magnet 362 is deactivated. Thus, any ferromagnetic material 361 that was previously held by the magnetic force is now released. Since there is no mixture 355 entering, and since the fluid outlet is closed, the released ferromagnetic material 361 flows out of the metal outlet for disposal or recycling.

When normal operation resumes, the process repeats itself. Thus, the metals within the recirculation loop are gathered and disposed of automatically.

Preferably, the inlet and the outlets have a smaller cross-sectional flow area than the chamber that is coupled to the magnet 362. As such, the fluid dynamics dictate that the inlet ejects the mixture 355 into the chamber at a relatively high velocity. The heavier particles, such as the metals, are propelled toward the magnet due to the momentum of the particles as they enter the chamber. The lighter particles, however, are directed to the fluid outlet due to their loss in speed as they enter the chamber. This is caused by the chamber having a larger cross-sectional flow area than the cross-sectional flow area of either the inlet or the fluid outlet.

Such a configuration, as described above with reference to FIG. 4, permits removal of tramp magnetic material with minimal, if any, human intervention. Also, for various embodiments, there is only a limited purge of the flowing material, and the flow is only interrupted briefly to accomplish that purge.

As shown with reference to FIGS. 1 through 4, multi-stage waste processing systems and processes result in greater waste removal. Additionally, such processes and systems permit recycling of various materials, which would otherwise not be permitted.

Although exemplary embodiments have been shown and described, it will be clear to those of ordinary skill in the art that a number of changes, modifications, or alterations to the disclosure as described may be made. For example, while two different types of thermal heating (oil and electric) are shown for the screws in the two chambers, it should be appreciated that both screws can be electrically heated. Also, while various dimensions are provided for clarity and completeness (e.g., length and diameter of screws, dimensions of chambers, etc.), it should be appreciated that these dimensions can be altered to accommodate various needs. Furthermore, while a two-stage heating process is described in great detail above, it should be appreciated that additional stages may be added to further process the waste material. All such changes, modifications, and alterations should therefore be seen as within the scope of the disclosure.

What is claimed is:

1. A waste processing system, comprising:
   means for carrying waste materials in a first direction, the waste material comprising ferromagnetic substances, the waste material further comprising non-ferromagnetic substances;
   means for attracting the ferromagnetic substances from said first direction carrying means; and
   means for subsequently carrying the attracted ferromagnetic substances in a second direction substantially perpendicular to the first direction, said subsequently carrying means arranged vertically above said carrying means, said subsequently carrying means associated with said attracting means.

2. A waste processing system, comprising:
   a first conveyor belt configured to carry waste materials in a first direction, the waste material comprising ferromagnetic substances, the waste material further comprising non-ferromagnetic substances;
   a magnet located in proximity to the first conveyor belt such that the first conveyor belt is within range of the attractive force of the magnet, the magnet being configured to attract the ferromagnetic substances; and
   a second conveyor belt interposed between the magnet and the first conveyor belt, the second conveyor belt being positioned vertically above and non-parallel to the first conveyor belt, the second conveyor belt being configured to remove the ferromagnetic substances from said first conveyor and to carry the attracted ferromagnetic substances in a second direction, the second direction being non-parallel to the first direction.

3. The system of claim 2, wherein the second conveyor belt is further configured to carry the ferromagnetic substances beyond the effective fringe field of the magnet.

4. The system of claim 3, further comprising:
   a chute operatively coupled to the second conveyor belt, the chute being configured to receive the ferromagnetic substances from the second conveyor belt, the chute further being configured to dispose of the received ferromagnetic substances.

5. The system of claim 3, further comprising:
   a disposal mechanism coupled to the first conveyor belt, the disposal mechanism being configured to receive remaining materials that are not attracted by the magnet, the disposal mechanism further being configured to dispose of the remaining materials.

6. The system of claim 2, wherein the magnet is an electromagnet.

7. The system of claim 2, wherein the magnet is a permanent magnet.

8. A method comprising the steps of:
carrying waste materials in a first direction, the waste material comprising ferromagnetic substances, the waste material further comprising non-ferromagnetic substances;
magnetically separating the ferromagnetic substances from the waste material via upward movement by magnetic attraction; and
carrying the magnetically-separated ferromagnetic substances in a second direction above the remaining waste materials being carried in the first direction, the second direction being non-parallel to the first direction.

9. The method of claim 8, further comprising the step of disposing of the ferromagnetic substances.

10. The method of claim 8, further comprising the step of disposing of remaining material after the ferromagnetic substances have been magnetically separated.

11. The method of claim 8, wherein the step of magnetically separating includes the step of subjecting the waste material to a magnetic field created by an electromagnet.

12. The method of claim 8, wherein the step of magnetically separating includes the step of subjecting the waste material to a magnetic field created by a permanent magnet.

* * * * *